(12) United States Patent
Kawanami et al.

(10) Patent No.: US 6,603,444 B1
(45) Date of Patent: Aug. 5, 2003

(54) DISPLAY ELEMENT AND DISPLAY DEVICE HAVING IT

(75) Inventors: Eriko Kawanami, Kawasaki (JP); Ichiro Onuki, Kawasaki (JP); Shigeo Ogura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 09/594,134

(22) Filed: Jun. 14, 2000

(30) Foreign Application Priority Data

Jun. 16, 1999 (JP) ............................................ 11-169493

(51) Int. Cl.[7] .............................. G09G 3/00; G09G 3/36; G02B 1/06
(52) U.S. Cl. ............................ 345/32; 345/97; 345/107; 359/666
(58) Field of Search ........................... 345/32, 107, 97; 264/401; 348/41; 349/57, 5, 112; 359/41, 666, 40; 356/257

(56) References Cited

U.S. PATENT DOCUMENTS

| | | | | |
|---|---|---|---|---|
| 5,208,648 A | * | 5/1993 | Batchelder et al. | 356/237.1 |
| 5,504,598 A | * | 4/1996 | Sprague et al. | 349/57 |
| 5,545,367 A | * | 8/1996 | Bae et al. | 118/423 |
| 5,550,656 A | * | 8/1996 | Sprague et al. | 349/5 |
| 6,262,706 B1 | * | 7/2001 | Albert et al. | 204/606 |
| 6,369,954 B1 | * | 4/2002 | Berge et al. | 349/200 |

* cited by examiner

*Primary Examiner*—Bipin Shalwala
*Assistant Examiner*—Prabodh Dharia
(74) *Attorney, Agent, or Firm*—Morgan & Finnegan, L.L.P.

(57) ABSTRACT

A display element has a plurality of pixels and is constructed to display image information by modulating light passing through each pixel. The display element has the following for each of the pixels: a mask having a shield portion in part; and a first fluid and an electroconductive or polar, second fluid being immiscible with each other. An amount of the light passing through the mask is regulated in such a way that a voltage applied to the second fluid of each pixel is varied to alter the shape of an interface between the first fluid and the second fluid, so as to increase or decrease light incident to the shield portion of the mask.

8 Claims, 4 Drawing Sheets

DARK DISPLAY

BRIGHT DISPLAY

DISPLAY ELEMENT AND DISPLAY DEVICE HAVING IT

BACKGROUND OF THE INVENTION

1. Field of the Invention

The present invention relates to a display element making use of the electrowetting phenomenon and a display device having it.

2. Related Background Art

Liquid crystal display elements are commonly used as conventional display elements. Many liquid crystal display elements are constructed of twisted nematic type liquid crystal cells having the twist angle of 90° and in such structure as to change the twist condition of liquid crystal molecules according to a state of an electric field placed between transparent electrode substrates to affect a state of polarization of transmitted light and to control transmission/non-transmission of light through a polarizer, thereby implementing display of image information.

There are also some proposals of display methods making use of scattering of light. As display elements making use of scattering of light, there are known display elements utilizing dispersion-type liquid crystals in which liquid crystals are dispersed in polymer; for example, National Publication of Translated Version of Japanese Patent Application No. 58-501631 (corresponding to U.S. Pat. No. 4,435,047) discloses NCAP film and National Publication of Translated Version of Japanese Patent Application No. 63-501512 (corresponding to U.S. Pat. No. 4,688,900) discloses PDLC film.

On the other hand, the electrowetting phenomenon (also called electrocapillarity) is known as a phenomenon in which interfacial tension varies with application of a voltage to a liquid to cause migration or deformation of an interface. This electrowetting phenomenon will be described referring to FIGS. 5A and 5B.

In FIGS. 5A and 5B, reference numeral 501 designates a substrate electrode, 502 an insulating layer formed on the substrate electrode 501, and 503 an electroconductive liquid droplet. FIG. 5A shows a state in which no voltage is applied between the substrate electrode 501 and the droplet 503 (V=0). When a voltage (V=V$_0$) is applied between the substrate electrode 501 and the droplet 503, as illustrated in FIG. 5B, a kind of capacitor is formed to accumulate electrostatic energy. This electrostatic energy changes the balance of surface tension of the droplet 503, whereby the shape of the droplet 503 is altered from the state of FIG. 5A in which no voltage is applied.

This electrowetting phenomenon described above is utilized in the varifocal lens disclosed in WO99/18456 and in the electrocapillary display sheet disclosed in Japanese Patent Application Laid-Open No. 9-311643.

SUMMARY OF THE INVENTION

An object of the present invention is to provide a display element of novel structure making use of the electrowetting phenomenon described above and a display device having it.

A display element of the present invention for accomplishing the above object is a display element comprising a plurality of pixels and constructed to display image information by modulating light passing through each pixel, said display element comprising the following for each of the pixels:

a mask having a shield portion in part; and
a first fluid and an electroconductive or polar, second fluid being immiscible with each other,
wherein an amount of light passing through said mask is regulated in such a way that a voltage applied to said second fluid of each pixel is varied to alter the shape of an interface between said first fluid and said second fluid, so as to increase or decrease light incident to the shield portion of said mask.

A display device of the present invention comprises a light source, the display element of the present invention described above, and lightguide means for guiding light from the light source to the display element.

DETAILED DESCRIPTION OF THE PREFERRED EMBODIMENTS

The embodiments of the present invention will be described below, but it is noted that the present invention is by no means intended to be limited to only these embodiments.

Embodiment 1

Figure 1A:
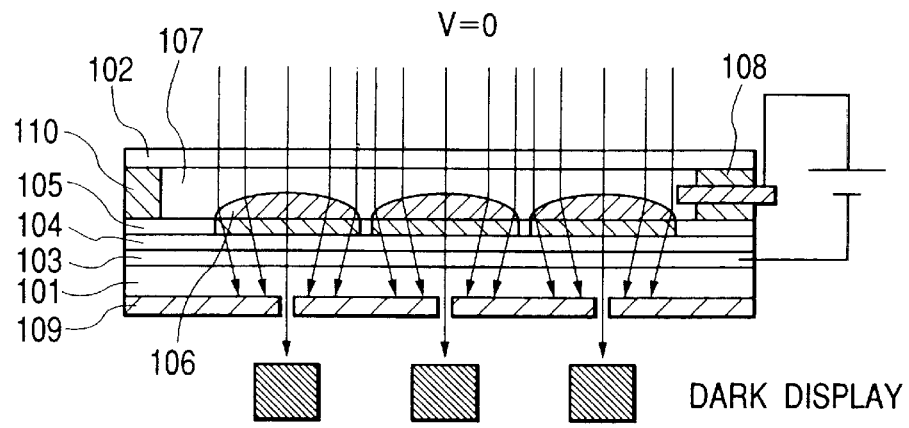
FIGS. 1A, 1B and 1C are drawings to show the schematic structure of the display element according to Embodiment 1.
Figure 1B:
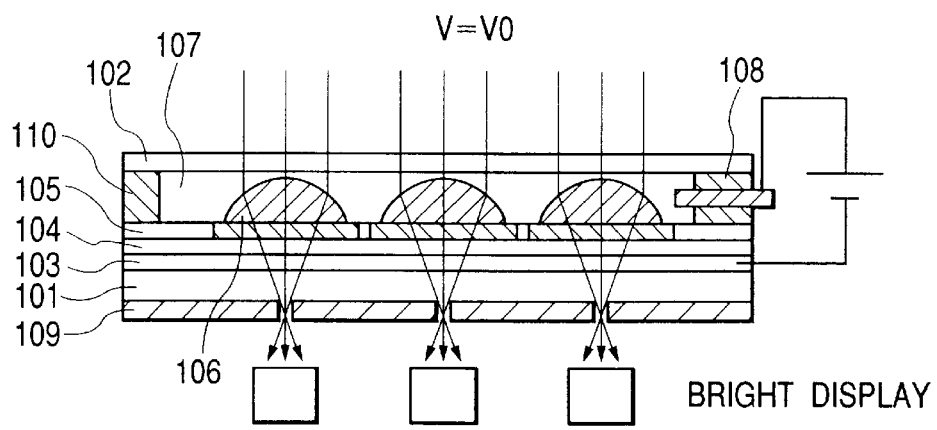

FIG. 1A and FIG. 1B are cross-sectional views of the display element according to Embodiment 1 of the present invention.

Figure 1C:
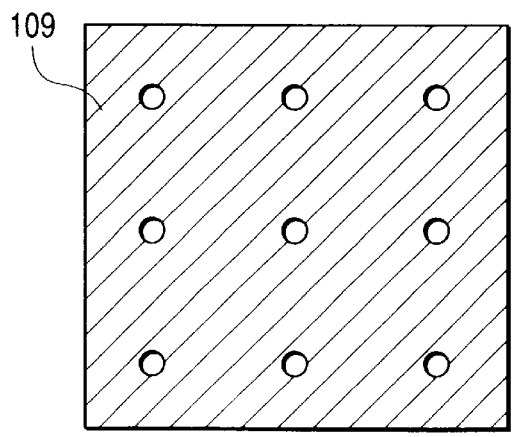

In the display element having a plurality of pixels, illustrated in FIGS. 1A, 1B, and 1C each of the pixels is composed of first and second substrates 101, 102 as supports, an active element array substrate 103 as a first electrode, an insulating layer 104, a surface treatment layer 105, a first liquid 106, an electrolyte solution 107 as an electroconductive, second liquid, the two liquids being confined in a space created between the substrates 101 and 102, an opposed electrode 108 as a second electrode, and a mask 109.

The substrates 101, 102 made of an optical material having the refractive index n$_P$ are transparent glass substrates having the thickness of 1 mm, and the substrate 103 is the active element array substrate formed on the substrate 101, for example, in such structure that there are active elements for switching, such as TFTs used in the conventional liquid crystal displays, pixel electrodes connected thereto, scan lines, and signal lines. The transparent insulating layer 104 is formed in the thickness of about 20 μm on the substrate 103 by dropping the replica resin (model number C001 available from Dai Nippon Insatsu) onto the active element array substrate 103, pressing a glass sheet thereonto, and thereafter exposing it to UV light for fifteen minutes.

It is desirable that the refractive index of the insulating layer 104 be substantially equal to the refractive index n$_P$ of the substrates 101 and 102.

The surface treatment layer 105 is made in the thickness of about 100 nm and in a mosaic pattern of Saitop (available from Asahi Glass) on the insulating layer 104 by dipping. The mask 109 is formed on the other surface of the substrate 101 than the one with the active element array substrate 103, insulating layer 104, and surface treatment layer 105 formed thereon and in such a manner that tungsten (W) or tungsten silicide (WSi) is formed in the thickness of 0.5 µm by sputtering or by CVD and that the thus formed layer is etched to remove portions aligned with center axes of grating areas of the mosaic-patterned surface treatment layer 105.

FIG. 1C is a plan view of the mask 109 formed in this way. Namely, the mask 109 includes light-transmitting portions in the portions aligned with the center axes of the grating areas of the surface treatment layer 105. The first liquid 106 of silicone oil TSF437 (available from Toshiba Silicones Co., Ltd.) and the electrolyte solution 107 of NaCl aqueous solution (3.0 wt %) adjusted so that the specific gravity thereof is substantially equal to that of the first liquid 106, are confined in the space between the substrate 101 with the active element array substrate 103, insulating layer 104, and surface treatment layer 105 formed thereon, and the substrate 102. The specific gravities of the first liquid 106 and the electrolyte solution 107 are preferably equal within the scope of ±10%. In the present embodiment "the specific gravities are substantially equal" means that the specific gravities of the two liquids 106, 107 are present in this scope of ±10%.

The first liquid 106 is kept from contact with the substrate 102 on the occasion of confining the two liquids 106, 107.

In order to avoid leakage of the first liquid 106 and the electrolyte solution 107 thus confined, the space is sealed by the opposed electrode 108 of nickel and a sealant 110 of a glass sheet or the like.

It is also desirable that the refractive index $n_A$ of the electrolyte solution 107 be substantially equal to that $n_P$ of the substrates 101, 102 ($n_P \approx n_A$).

The first liquid 106 is the liquid immiscible with the electrolyte solution 107, for example, like silicone oil, and the refractive index $n_B$ of the liquid 106 is desirably larger than that $n_P$ of the substrates 101, 102 ($n_B >> n_P$).

The difference between the refractive indexes of the first liquid 106 and the electrolyte solution 107 is preferably not less than 0.05 and in the present embodiment the refractive index of the first liquid 106 is 1.49 while the refractive index of the electrolyte solution 107 is 1.34. Therefore, the incident light is refracted at the interface between the first liquid 106 and the electrolyte solution 107. In the state of V=0 where no voltage is applied to the electrolyte solution 107, i.e., where no voltage is applied to the electrolyte solution 107 between the active element array substrate 103 and the opposed electrode 108 of nickel (FIG. 1A), since the first liquid 106 has a small angle $\theta_O$ of contact against the substrate 101 with the active element array substrate 103, insulating layer 104, and surface treatment layer 105 formed thereon, the light is hardly converged and thus the most light is cut by the mask 109, whereby the display of each pixel is in an off state (dark display).

When a voltage is applied between the active array element substrate 103 and the opposed electrode 108 (FIG. 1B), i.e., when V=V0, the interfacial tension varies between the first liquid 106 and the electrolyte solution 107 to deform the interface, whereby the contact angle $\theta_V$ of the first liquid 106 against the substrate 101 with the active element array substrate 103, insulating layer 104, and surface treatment layer 105 formed thereon becomes larger than the contact angle $\theta_O$ ($\theta_V > \theta_O$). In this case, the light is converged at almost one point in each light-transmitting portion of the mask 109 and most of the light passes through the mask 109, so that the display of each pixel is in an on state (bright display). Since the present embodiment employs the active element array substrate 103, the first liquid 106 can be driven independently in each of the pixels arranged in an array, by applying the voltage to all the signal lines in synchronism with sequential activation of the scan lines.

The material of the substrates 101, 102 can be one selected from glasses, or plastics such as polytetrafluoroethylene, polycarbonate, and acrylic resin.

It is desirable that the refractive index of the insulating layer 104 be substantially equal to the refractive index $n_P$ of the substrates 101 and 102, and the insulating layer 104 can be a film made of an ultraviolet-curable replica resin, a film formed by casting, or a film deposited by sputtering or by chemical vapor deposition.

The ultraviolet-curable resin can be one selected from acrylate base, unsaturated polyester/styrene base, polyethylene/thiol base, epoxy/Lewis acid base, and other resins.

When it is necessary to adjust the polymerization rate or viscosity, different materials are blended, or a monomer or an oligomer with different polymerization degree is added. A photopolymerization initiator is one selected from acetophenone, benzophenone, benzil, benzoin, thioxanthone, etc. and derivatives thereof, and tetramethylthiuram monosulfide (TSM), and so on.

The concentration of the polymerization initiator is preferably 0.3 to 5.0% over the polymer, and more preferably 0.5 to 3.0%.

Preferred resins that can be used in the casting method include the acrylic resin such as PMMA and the like, polystyrene, polycarbonate, polyvinyl alcohol, polyarylate, polyether sulfone, siloxane base resin, etc., because they are readily soluble in various solvents. However, the epoxy resin, polyamide base resin, polyvinylidene fluoride, polyethylene, and copolymers thereof can also be used depending upon selection of the solvent.

The resins that can be used in the sputtering method or in the chemical vapor deposition process include polytetrafluoroethylene and other fluorine-treated polymers.

The surface treatment layer 105 can be a coating of Saitop made by dipping, a coating of a solution obtained by diluting one or two or more silicon compounds out of methyltrimethoxysilane, dimethylmethoxysilane, and N-(β-aminoethyl)-γaminopropylmethyldimethoxysilane with water, or a coating of a mixed solution containing at least two compounds selected from fluoroalkylsilane compounds, long-chain fatty acid silane compounds, and silicon isocyanate, a diluent solvent, and an acid catalyst.

The electrolyte solution 107 confined between the substrates 101, 102 can be an aqueous solution in which an electrolyte such as NaCl or $Na_2SO_4$ or the like is dissolved, or one selected from polar liquids such as water, alcohol, acetone, formamide, and ethylene glycol, and mixtures thereof with another appropriate liquid.

The first liquid 106 is the liquid immiscible with the electrolyte solution 107, for example, like silicone oil.

The refractive index of the first liquid 106 is desirably larger than that of the electrolyte solution 107.

The opposed electrode 108 can be made of a material selected from gold, platinum, stainless steel, nickel, silver, and indium/tin oxide and can be formed in the flat-plate or rodlike shape as long as it is in contact with the electrolyte solution 107. The mask 109 can be one formed by depositing tungsten (W) or tungsten silicide (WSi) by sputtering or by CVD, and is desirably a film of at least one metal selected from high-melting-point metals such as molybdenum and titanium.

The sealant 110 can be made of a material selected from glasses, acrylic resin, and metals and can be formed in the flat-plate, circular, or rodlike shape as long as it can seal the space.

In FIGS. 1A to 1C, one opening of the space is sealed by the opposed electrode 108 while the other opening by the glass sealant 110, but the both openings may also be sealed by the glass sheet.

The mask 109 is formed directly on the substrate 101 in Embodiment 1, but it can also be contemplated as a modification of Embodiment 1 that a mosaic-patterned shield substrate made of metal or the like is used instead of the shield film for intercepting light.

Embodiment 2

Figure 2A:
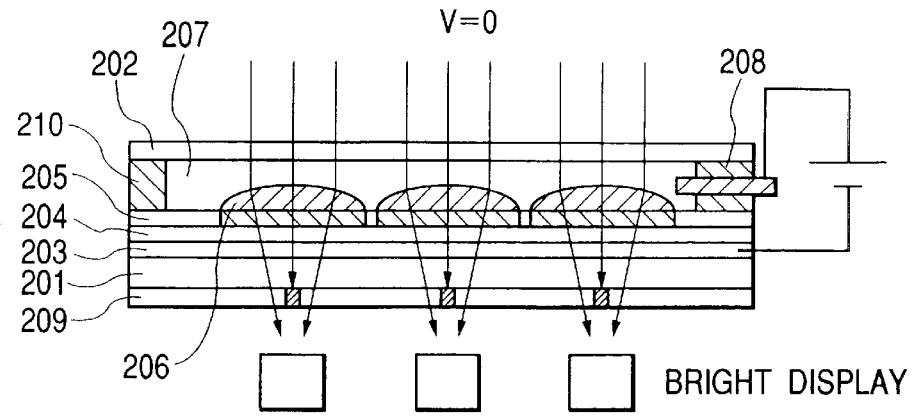
FIGS. 2A, 2B and 2C are drawings to show the schematic structure of the display element according to Embodiment 2.
Figure 2B:
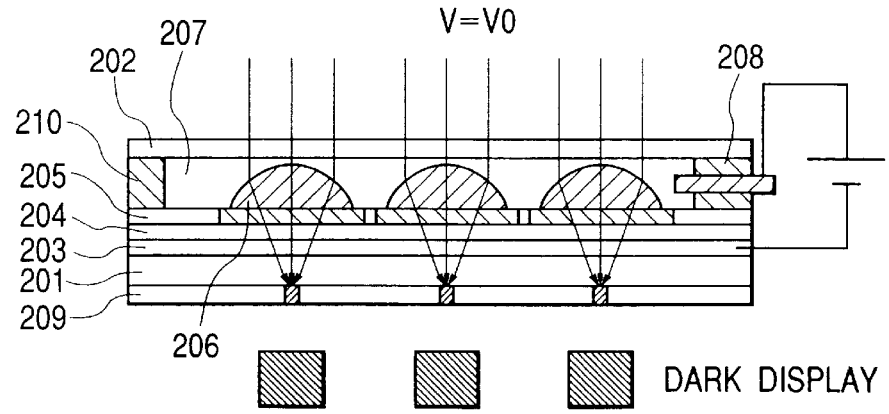

FIGS. 2A and 2B are cross-sectional views of the display element according to Embodiment 2 of the present invention.

In the display element having a plurality of pixels, illustrated in FIGS. 2A and 2B, each pixel is composed of the first and second substrates 201, 202 as supports, the active element array substrate 203 as a first electrode, the insulating layer 204, the surface treatment layer 205, the first liquid 206 and the electrolyte solution 207 as an electroconductive, second liquid confined in the space created between the substrates 201 and 202, the opposed electrode 208 as a second electrode, and the mask 209. The mask 209, which is made in similar fashion to that in Embodiment 1, is formed on the other surface of the substrate 201 than the surface with the active element array substrate 203, insulating layer 204, and surface treatment layer 205 formed thereon, by forming a layer of tungsten (W) or tungsten silicide (WSi) in the thickness of 0.5 μm by sputtering or CVD and thereafter etching the layer so as to leave the portions aligned with the center axes of the grating areas of the mosaic-patterned surface treatment layer 205.

Figure 2C:
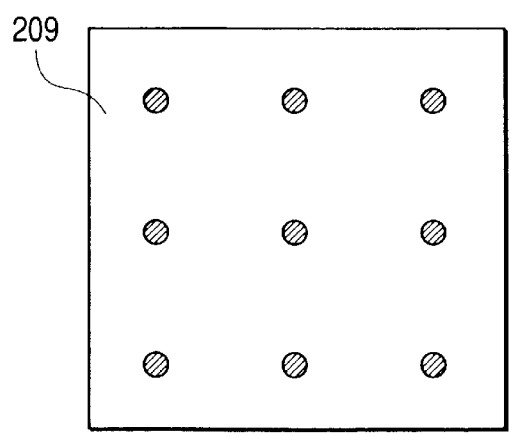

FIG. 2C is a plan view of the mask 209 formed in this way. Namely, the mask 209 has shield portions in the portions aligned with the center axes of the grating areas.

Just as in Embodiment 1, the first liquid 206 of silicone oil TSF437 (available from Toshiba Silicone) and the electrolyte solution 207 of NaCl aqueous solution (3.0 wt %) adjusted so that the specific gravity thereof is substantially equal to that of the first liquid 206, are confined in the space between the substrate 201 with the active element array substrate 203, insulating layer 204, and surface treatment layer 205 formed thereon, and the substrate 202, and the space is sealed by the opposed electrode 208 of nickel and the sealant 210 of a glass sheet or the like in order to avoid leakage of the first liquid 206 and the electrolyte solution 207 thus confined.

Since the refractive index of the first liquid 206 is 1.49 and the refractive index of the electrolyte solution 207 is 1.34, the incident light is refracted at the interface between the first liquid 206 and the electrolyte solution 207. However, in the state in which no voltage is applied between the active element array substrate 203 and the opposed electrode 208 (FIG. 2A), i.e., when V=0, since the contact angle $\theta_O$ of the first liquid 206 is small against the substrate 201 with the active element array substrate 203, insulating layer 204, and surface treatment layer 205 formed thereon, the light is hardly converged and most of the light is transmitted without being cut by the mask 209, so that the display of each pixel is in the on state (bright display).

When the voltage is applied between the active element array substrate 203 and the opposed electrode 208 (FIG. 2B), i.e., when V=V0, the interfacial tension varies between the first liquid 206 and the electrolyte solution 207 to deform the interface, so that the contact angle $\theta_V$ of the first liquid 206 becomes larger than the contact angle $\theta_O$ under no voltage against the substrate 201 with the active element array substrate 203, insulating layer 204, and surface treatment layer 205 formed thereon ($\theta_O>\theta_O$). Thus the light is converged at almost one point in each shield portion of the mask 209 and most of the light is cut by the mask 209, so that the display of each pixel is in the off state (dark display). Since the active element array substrate 203 is used herein, the first liquid 206 can be driven independently one by one in the array of pixels by applying the voltage to all the signal lines in synchronism with sequential activation of the scan lines.

The materials used in Embodiment 2 can be the same as in Embodiment 1.

Embodiment 3

Figure 3A:
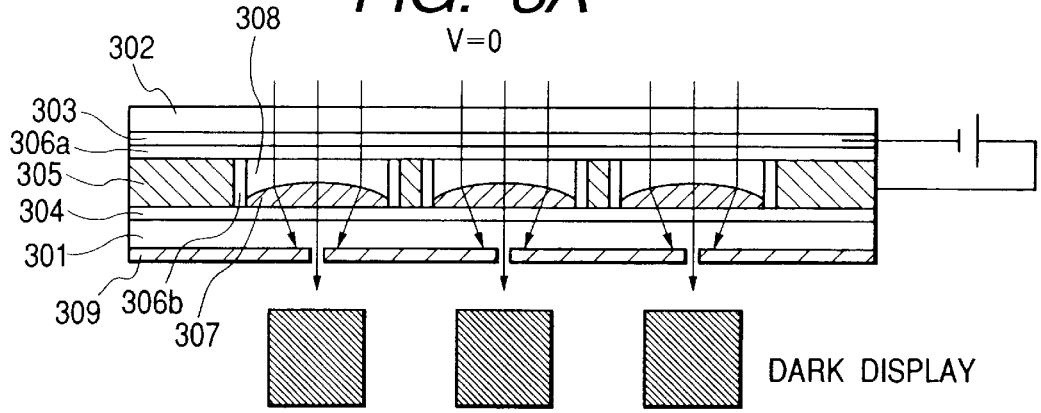
FIGS. 3A, 3B and 3C are drawings to show the schematic structure of the display element according to Embodiment 3.
Figure 3B:
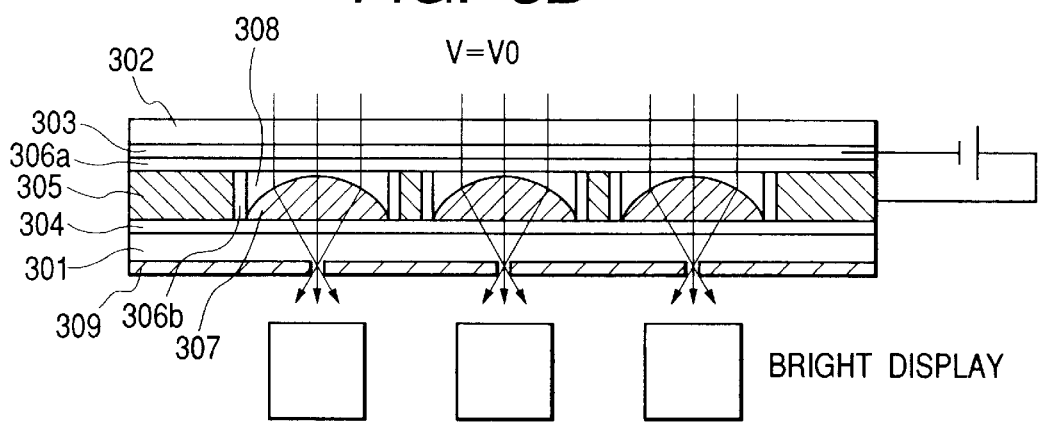

FIGS. 3A and 3B are cross-sectional views of the display element according to Embodiment 3 of the present invention.

In the display element illustrated in FIGS. 3A and 3B, each pixel is comprised of the first and second substrates 301, 302, the active element array substrate 303 as a first electrode, the surface treatment layer 304, the opposed electrode 305 as a second electrode, the insulating layer 306, the first liquid 307 and the electrolyte solution 308 as a second liquid confined in the space created between the substrates 301 and 302, and the mask 309.

The substrates 301, 302 made of the optical material having the refractive index $n_P$ are transparent glass substrates having the thickness of 1 mm, and the substrate 303 is the active element array substrate formed on the substrate 302, for example, in such structure that there are the active elements for switching, such as the TFTs used in the conventional liquid crystal display devices, the pixel electrodes connected thereto, the scan lines, and the signal lines. The masaic-patterned transparent insulating layer 306a is formed in the thickness of about 20 μm on the active element array substrate 303 by dropping the replica resin (model number C001 available from Dai Nippon Insatsu) onto the substrate 303, pressing the glass sheet thereto, and thereafter exposing it to UV light for fifteen minutes.

On the substrate 301, the mosaic-patterned surface treatment layer 304 is made in the thickness of about 100 nm and of Saitop (available from Asahi Glass) by dipping.

Figure 3C:
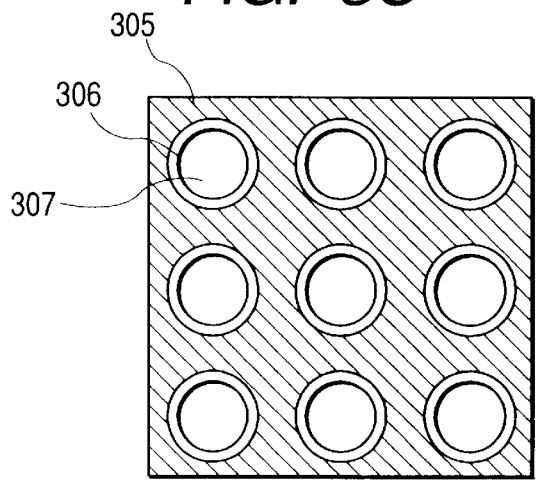

Numeral 305 designates the opposed electrode of aluminum (the second electrode, FIG. 3C) with cylinders, and an insulating layer 306b of about 10 μm is formed inside each cylinder of the opposed electrode 305 by electrodeposition coating. The opposed electrode 305 with the insulating layers 306b formed therein is bonded to the substrate 301 with the surface treatment layer 304 formed thereon.

The mask 309 is formed on the other surface of the substrate 301 than the surface with the opposed electrode 305, by depositing the layer of tungsten (W) or tungsten silicide (WSi) in the thickness of 0.5 μm by sputtering or by CVD and thereafter etching the layer so as to remove the portions aligned with the center axes of the grating areas of the mosaic-patterned surface treatment layer 304. Namely, the mask 309 has light-transmitting portions in the portions aligned with the center axes of the grating areas of the surface treatment layer 304.

The first liquid 307 of silicone oil TSF437 (available from Toshiba Silicone) and the electrolyte solution 308 of NaCl aqueous solution (3.0 wt %) adjusted so that the specific gravity thereof is substantially equal to that of the first liquid 307, are confined in each cylinder of the opposed electrode 305 formed on the substrate 302 with the active element array substrate 303 and the insulating layer 306a formed thereon, and on the substrate 301.

The specific gravities of the first liquid 307 and the electrolyte solution 308 are preferably equal within the scope of ±10%.

The first liquid 307 is kept from contact with the substrate 301 on the occasion of confining the liquids.

It is also desirable that the refractive index $n_A$ of the electrolyte solution 308 be substantially equal to the refractive index $n_P$ of the substrates 301, 302 ($n_P \approx n_A$).

The first liquid 307 is the liquid immiscible with the electrolyte solution 308, for example, like silicone oil, and the refractive index $n_B$ of the first liquid 307 is desirably larger than that $n_P$ of the substrates 301, 302 ($n_B >> n_P$).

In the state in which no voltage is applied between the active element array substrate 303 and the opposed electrode 305 of aluminum (FIG. 3A), i.e., when V=0, the contact angle $\theta_O$ is small between the first liquid 307 and the substrate 301 with the surface treatment layer 304 formed thereon and thus the light is hardly converged. Therefore, most of the light is cut by the mask 309, so that the display of each pixel is in the off state (dark display).

When the voltage is applied between the active array element substrate 303 and the opposed electrode 305 (FIG. 3B), i.e., when V=V0, the interfacial tension varies between the first liquid 307 and the electrolyte solution 308 to deform the interface, whereby the contact angle $\theta_V$ becomes larger than the contact angle $\theta_O$ under no voltage between the first liquid 307 and the substrate 301 with the surface treatment layer 304 formed thereon ($\theta_V > \theta_O$). Therefore, the light is converged at almost one point in each light-transmitting portion of the mask 309, and most of the light travels through the mask 309, so that the display of each pixel is in the on state (bright display). Since the active element array substrate 303 is used herein, the first liquid 307 can be driven independently one by one in the array of pixels, by applying the voltage to all the signal lines in synchronism with the sequential activation of the scan lines.

The present embodiment can utilize all the light effectively, because the active element array substrate 303 as the first electrode is arranged perpendicularly to the opposed electrode 305 as the second electrode and the first liquid 307 is in contact with the opposed electrode 305 as the second electrode. The materials used in Embodiment 3 can be the same as in Embodiment 1.

Embodiment 4

Figure 4A:
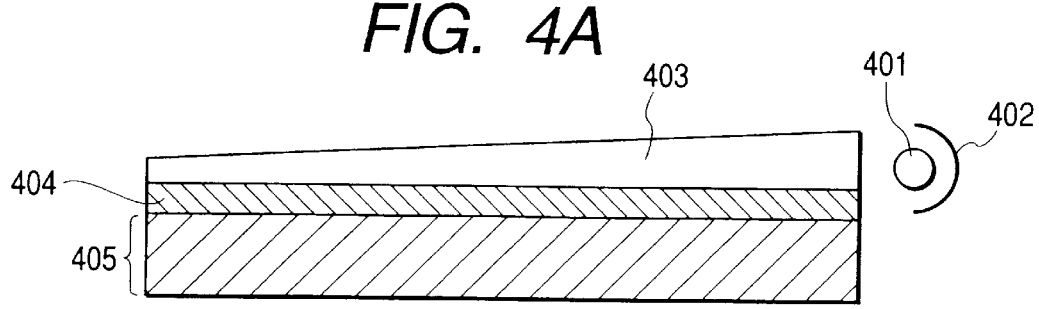
FIGS. 4A and 4B are drawings to show the schematic structure of the display device according to Embodiment 4.
Figure 4B:
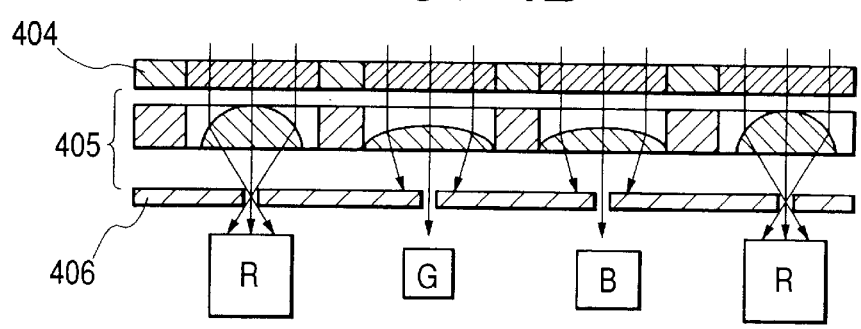
Figure 5A:
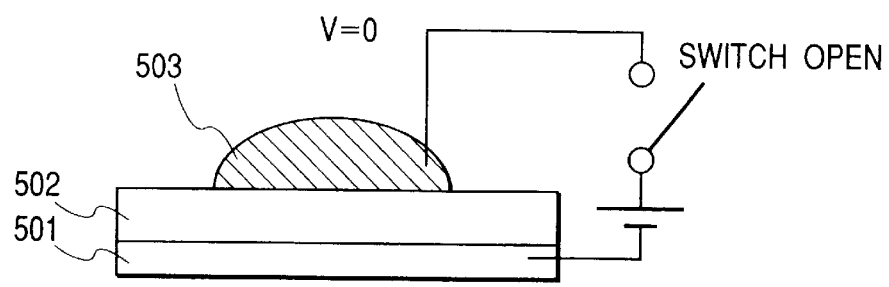
FIGS. 5A and 5B are drawings to show change of the liquid droplet between before and after the application of voltage, for explaining the electrowetting phenomenon.
Figure 5B:
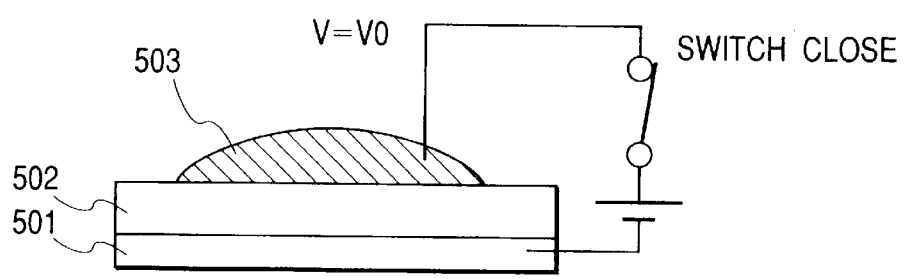

FIGS. 4A and 4B are cross-sectional views of the display device according to Embodiment 4 of the present invention.

The display device illustrated in FIGS. 4A and 4B is composed of a lamp 401 as a light source, a reflector 402, a lightguide plate 403, a color filter 404, and the display element 405 described in Embodiment 1, Embodiment 2, or Embodiment 3, as a display element having a plurality of pixels.

Light emitted from the lamp 401 is reflected by the reflector 402 to travel through the lightguide plate 403. White light emerging from the lightguide plate 403 is split into beams of three colors, red, green, and blue, by the color filter 404 and thereafter the light travels through the display element 405 to be regulated in amounts of the respective color beams. Then the beams emerge from the device.

In the display device of the present embodiment, when the voltage is applied, the shape of the interface is altered between the first liquid and the electrolyte solution of the second liquid confined in the display element, to change the focal lengths for the beams passing through the interface, so as to regulate light amounts of the beams passing through the mask, thereby displaying the pixels at different emission amounts of the respective beams (FIG. 4B).

Since the present embodiment requires no mechanical driving mechanism for regulating the emission amounts, the display device can be constructed in compact size. The display device of the present embodiment is provided with the color filter layer, but the display device can also be constructed without the color filter layer so as to implement black-and-white display.

Since there is no need for the mechanical driving mechanism as a means for regulating the light amounts, the display element or the display device described above in either of Embodiment 1 to Embodiment 4, permits reduction in the size of device. Since the light amounts are regulated by making use of the electrowetting phenomenon, switching of display can be implemented efficiently by the variation in light amounts.

What is claimed is:

1. A display element comprising a plurality of pixels and constructed to display image information by modulating light passing through each pixel, said display element comprising the following for each of the pixels:

a mask having a shield portion in part; and a first fluid and a second fluid which are immiscible with each other, said second fluid being electroconductive or polar, wherein an amount of the light passing through said mask is regulated by a voltage applied to said second fluid of each pixel varied to alter the shape of an interface between said first fluid and said second fluid, so as to increase or decrease light incident to the shield portion of said mask.

2. The display element according to claim 1, further comprising:

a first electrode kept in an electrically insulated state from said second fluid; and a second electrode kept in an electrically conducting state to said second fluid, wherein the shape of the interface between said first fluid and said second fluid is altered by varying the voltage applied between said first electrode and said second electrode in each pixel.

3. The display element according to claim 1, wherein by varying the voltage applied to said second fluid in each pixel, the shape of the interface is altered between said first fluid and said second fluid changing a position of convergence of the light passing through the interface.

4. The display element according to claim 1, wherein said first fluid and said second fluid have respective specific gravies substantially equal to each other.

5. The display element according to claim 1, wherein a difference between refractive indexes of said first fluid and said second fluid is not less than 0.05.

6. A display device comprising:

a light source;

a display element comprising a plurality of pixels and constructed to display image information by modulating light passing through each pixel, said display element comprising the following for each of the pixels:

a mask having a shield portion in part; and a first fluid and a second fluid which are immiscible with each other, said second fluid being electroconductive or polar, wherein an amount of light passing through said mask is regulated by a voltage applied to said second fluid of each pixel varied to alter the shape of an interface between said first fluid and said second fluid, so as to increase or decrease light incident to the shield portion of said mask; and a light guide to guide light from said light source to said display element.

7. The display device according to claim 6, further comprising a color filter positioned between the light source and the display elememt.

8. The display device according to claim 7, wherein said color filter is positioned between said light guide and said display elememt.

* * * * *